US010885137B2

(12) United States Patent
Bastide et al.

(10) Patent No.: US 10,885,137 B2
(45) Date of Patent: Jan. 5, 2021

(54) IDENTIFYING MICRO-EDITING EXPERTS WITHIN AN APPROPRIATE NETWORK

(71) Applicant: International Business Machines Corporation, Armonk, NY (US)

(72) Inventors: Paul Bastide, Boxford, MA (US); Jonathan Dunne, Dungarvan (IE); Liam Harpur, Dublin (IE); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 15/938,932

(22) Filed: Mar. 28, 2018

(65) Prior Publication Data

US 2019/0303502 A1    Oct. 3, 2019

(51) Int. Cl.
*G06F 16/9535*   (2019.01)
*G06F 16/335*    (2019.01)
*G06F 16/635*    (2019.01)

(52) U.S. Cl.
CPC ........ *G06F 16/9535* (2019.01); *G06F 16/337* (2019.01); *G06F 16/635* (2019.01)

(58) Field of Classification Search
None
See application file for complete search history.

(56) References Cited

U.S. PATENT DOCUMENTS

| 7,395,222 | B1 | 7/2008 | Sotos |
| 8,601,023 | B2 | 12/2013 | Brave et al. |
| 8,943,131 | B2 | 1/2015 | Fontenot et al. |
| 2008/0028300 | A1 | 1/2008 | Krieger et al. |
| 2009/0030897 | A1 | 1/2009 | Hatami-Hanza |
| 2013/0007121 | A1* | 1/2013 | Fontenot .............. G06Q 10/101 709/204 |
| 2013/0132138 | A1 | 5/2013 | Doganata et al. |
| 2014/0379818 | A1* | 12/2014 | Cudak .................... H04L 51/16 709/206 |
| 2015/0032751 | A1 | 1/2015 | Ting et al. |

(Continued)

OTHER PUBLICATIONS ip.com, "Leveraging social media contributions for dynamic skill-based routing". IP.com No. IPCOM000235940D, Mar. 31, 2014, 4 pages.

(Continued)

*Primary Examiner* — Son T Hoang
(74) *Attorney, Agent, or Firm* — L. Jeffrey Kelly (57) ABSTRACT

A version analysis of reference materials is performed to identify different versions of the reference materials from an update history. Collaborative or social reference data for the different versions of the reference materials is analyzed to identify authors and contributors of subject matter contained in the reference materials. Affinity weights are assigned to the authors and contributors of the subject matter contained in the reference materials based on the authors' and contributors' history. The assigned affinity weights are aggregated to generate a cumulative relevance for the authors and contributors, wherein the cumulative relevance is used to infer which of the authors and contributors are the micro-editing experts within the appropriate network for the subject matter contained in the reference materials. A view is generated that identifies the micro-editing experts within the appropriate network.

36 Claims, 5 Drawing Sheets (56) References Cited

U.S. PATENT DOCUMENTS

2015/0317564 A1* 11/2015 Chen ................... G06N 20/00
706/52
2019/0066230 A1* 2/2019 Dange .................. G06Q 50/01

OTHER PUBLICATIONS ip.com, "Dynamic Weighted documentation paths from social and collaborative knowledge sharing". IP.com No. IPCOM000231137D, Sep. 30, 2013, 6 pages.
http://www.eweek.com/enterprise-apps/expertise-location-systems-pervasive-or-invasive.
https://blog.highq.com/enterprise-collaboration/find-right-person-job-smart-expertise-location/.
https://www.ibm.com/blogs/research/2014/02/from-ibm-connect-2014-how-to-find-the-expert-you-need/.
http://www.wsj.com/articles/SB10001424127887324009304579040861915722896.

* cited by examiner

| ROLE 400 | NAME 402 | REFERENCE MATERIALS 404 | ENTITY 406 | RELEVANCE 408 | CUMULATIVE RELEVANCE 410 | VERSION 412 |
|---|---|---|---|---|---|---|
| AUTHOR | A | ONLINE DOCUMENT 300 | TOPIC | 0.7677 | 0.5855 | ORIGINAL 302 |
| AUTHOR | B | ONLINE DOCUMENT 300 | TOPIC | 0.7677 | 0.5855 | ORIGINAL 302 |
| AUTHOR | C | ONLINE DOCUMENT 300 | TOPIC | 0.7677 | 0.5855 | ORIGINAL 302 |
| AUTHOR | A | ONLINE DOCUMENT 300 | SUB-TOPIC | 0.7666 | 0.5855 | ORIGINAL 302 |
| AUTHOR | B | ONLINE DOCUMENT 300 | SUB-TOPIC | 0.7666 | 0.5855 | ORIGINAL 302 |
| AUTHOR | C | ONLINE DOCUMENT 300 | SUB-TOPIC | 0.7666 | 0.5855 | ORIGINAL 302 |
| CONTRIBUTOR | D | ONLINE DOCUMENT 300 | SUB-SUB-TOPIC | 0.5787 | 0.5787 | REVISION 304 |

IDENTIFYING MICRO-EDITING EXPERTS WITHIN AN APPROPRIATE NETWORK

BACKGROUND

The present invention relates generally to a method and system for identifying micro-editing experts within an appropriate network.

When an individual has a question, they often go to an online resource, such as a wiki, blog, forum, or other social reference application, for reference materials. Typically, they will review the reference materials for an answer to their question. Invariably, the individual seeking information typically considers a main author of the wiki, blog, forum, or other social reference application, as an expert in the subject matter of the reference materials.

However, such social reference applications allow individuals to post feedback, comments or revisions, and the like, to the reference materials. The individual seeking information may not be aware that contributions to the reference materials could be made via comments, email, and/or revisions, or other means, which may be used to modify the reference materials from their original form.

One issue is that the impact of these contributions is not quantified in terms of overall efficacy of the reference materials. In addition, these contributions may not be surfaced in a way that gives visibility and provenance to the contributor, nor to the contributor's standing as an expert in the subject matter of the reference materials.

Thus, there is a need in the art for methods and systems for identifying micro-editing experts within an appropriate network. The present invention satisfies that need.

SUMMARY

The invention provided herein has a number of embodiments useful, for example, in implementing a method, system and computer program product for identifying micro-editing experts within an appropriate network. A version analysis of reference materials is performed to identify different versions of the reference materials from an update history. Collaborative or social reference data for the different versions of the reference materials is analyzed to identify authors and contributors of subject matter contained in the reference materials. Affinity weights are assigned to the authors and contributors of the subject matter contained in the reference materials based on the authors' and contributors' history. The assigned affinity weights are aggregated to generate a cumulative relevance for the authors and contributors, wherein the cumulative relevance is used to infer which of the authors and contributors are the micro-editing experts within the appropriate network for the subject matter contained in the reference materials. A view is generated that identifies the micro-editing experts within the appropriate network.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

The present invention comprises a computer-implemented method and system for identifying micro-editing experts within an appropriate network. In general, this invention extends the idea of expertise location, by analyzing a version history of reference materials on an online resource, such as a wiki, blog, forum, and/or other social reference application, and the like, to identify contributions made to the reference materials by micro-editing, such as by feedback, comments, revisions, or other means, in order to identify a contributor to the reference materials who can be classified as a micro-editing expert within an appropriate network directed to the subject matter of the reference materials.

Hardware and Software Environment

Figure 1:
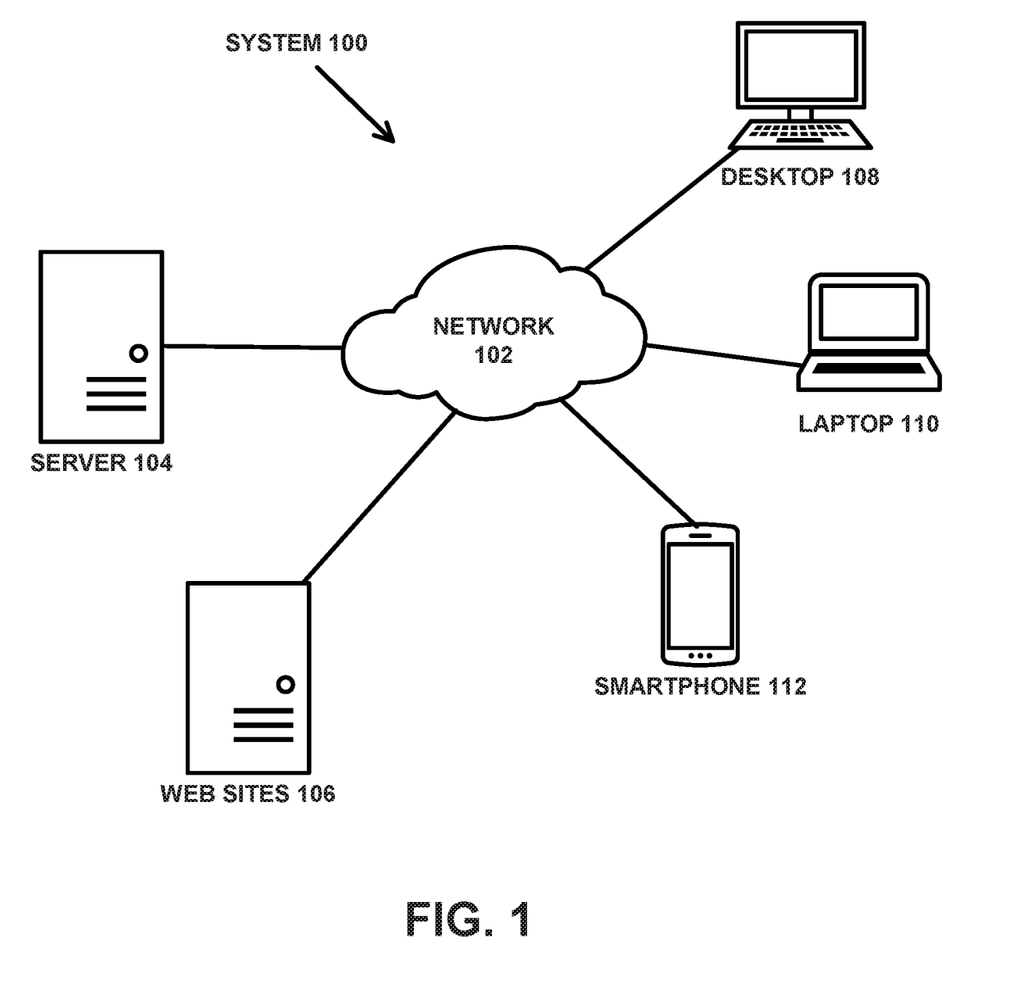
FIG. 1 is a pictorial representation of a system for identifying micro-editing experts within an appropriate network, according to one embodiment.

FIG. 1 is a pictorial representation of a system 100 for identifying micro-editing experts within an appropriate network, according to one embodiment.

The system 100 includes a network 102, which is the medium used to provide communications links between various devices and computers connected together within the system 100. In the depicted example, the network 102 may be the Internet or another network.

A server computer 104 is connected to the network 102, along with one or more web sites 106 that can be categorized as an online resource that contains reference materials, such as a wiki, blog, forum, or other social reference application. In addition, client devices 108, 110, 112 are connected to the server computer 104 and web sites 106 via the network 102. These client devices 108, 110, 112 may be, for example, desktop computers 108, laptop or notebook computers 110, smartphones 112 and other devices.

The server computer 104, web sites 106, and client devices 108, 110, 112, are typically comprised of one or more processors, random access memory (RAM), read-only memory (ROM), and other components such data storage devices and data communications devices. Moreover, the server computer 104, web sites 106, and client devices 108, 110, 112, execute one or more computer programs operating under the control of an operating system. At least some of these computer programs perform various functions and steps as described in more detail below.

Micro-Editing Experts

Figure 2:
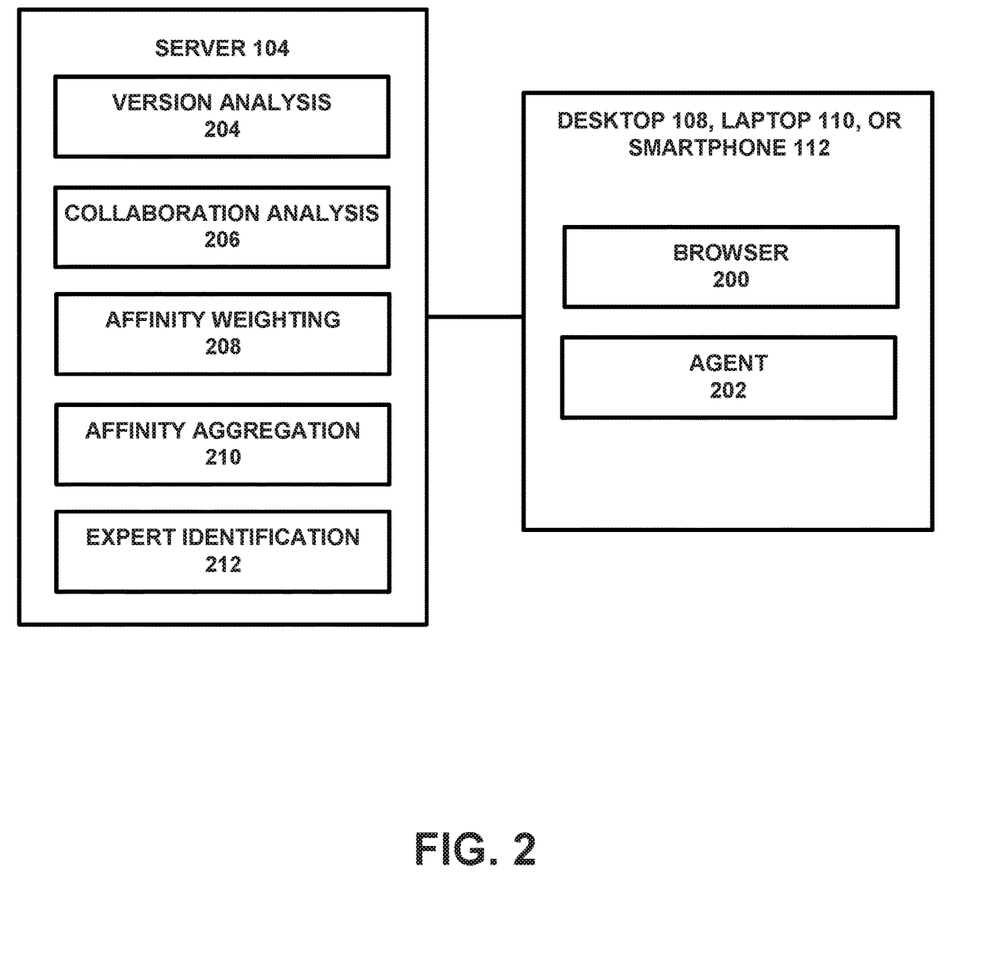
FIG. 2 is a block diagram illustrating how identifying micro-editing experts within an appropriate network is implemented by the system, according to one embodiment.

FIG. 2 is a block diagram illustrating how identifying micro-editing experts within an appropriate network is implemented by the system 100, according to one embodiment. In this embodiment, the system 100 is implemented using:

a browser 200 or agent 202 executed on the user's devices 108, 110, 112, so that the user can browse reference materials on the web sites 106 and then invoke the system 100 for identifying and locating an expert for subject matter contained with the reference materials; and a plurality of modules 204-212 executed on the server 104 that analyze the reference materials on the web sites 106 as invoked by the browser 200 or agent 202 to identify and locate experts for the subject matter contained with the reference materials.

In alternative embodiments, however, these functions may be wholly performed on the server 104 or client devices 108, 110, 112.

To analyze the reference materials on the web sites 106, the server 104 performs the following steps and functions:

A Version Analysis Module 204 performs a version analysis of the reference materials to identify different versions of the reference materials from its update history. In many instances, the reference materials themselves contain the update history, including an original version, as well as feedback, comments or revisions, and the like, when created and or modified using collaborative editors, such as Box.net™ Notes, IBM™ Docs, Google™ Docs, Microsoft™ Word, and other collaborative editors.

A Collaboration Analysis Module 206 analyzes collaborative and/or social reference data from the different versions of the reference materials to identify authors of and contributors to the subject matter contained within the reference materials. In many instances, the reference materials themselves contain collaborative and/or social reference data, such as authors of the original version, as well as contributors of feedback, comments or revisions, and the like, when created and or modified using collaborative editors, such as Box.net™ Notes, IBM™ Docs, Google™ Docs, Microsoft™ Word, and other collaborative editors.

Specifically, the Collaboration Analysis Module 206 generates a set of entity classes for contributions made by various persons to the subject matter contained with the reference material. The set of entity classes may include: the roles played by the various persons (e.g., author and/or contributor); the identity of the various persons (e.g., the names); the identity of the reference materials (e.g., document name and/or its locater); the entities within the subject matter (e.g., topics); the relevance of the various persons to each of the entities; the cumulative relevance of the various persons, and the versions of the reference materials.

Note that, in this regard, there may be any number of topics within the subject matter. Moreover, a topic may be hierarchical and comprise any number of levels of sub-topics, sub-sub-topics, etc., within the topic. As set forth herein, any reference to a "topic" may comprise a reference to a topic, sub-topic, sub-sub-topic, etc.

An Affinity Weighting Module 208 assigns affinity weights to the authors and contributors of the subject matter based on the authors' and contributors' history. The assigned affinity weights determine the relevance of the various persons to each of the entities within the subject matter.

An Affinity Aggregation Module 210 aggregates the assigned affinity weights to generate a cumulative relevance for the authors and contributors, wherein the cumulative relevance is used to infer which of the authors and contributors are the micro-editing experts within the appropriate network for the subject matter contained in the reference materials. Note that, in this regard, the assigned affinity weights may be aggregated across different entities within the subject matter, and may be aggregated across different reference materials, different web sites 106, etc.

An Expert Identification Module 212 reports this information to the user who invoked the system 100 for identifying micro-editing experts within an appropriate network. Specifically, the Expert Identification Module 212 generates a view that identifies the micro-editing experts within the appropriate network.

Use Case

Figure 3:
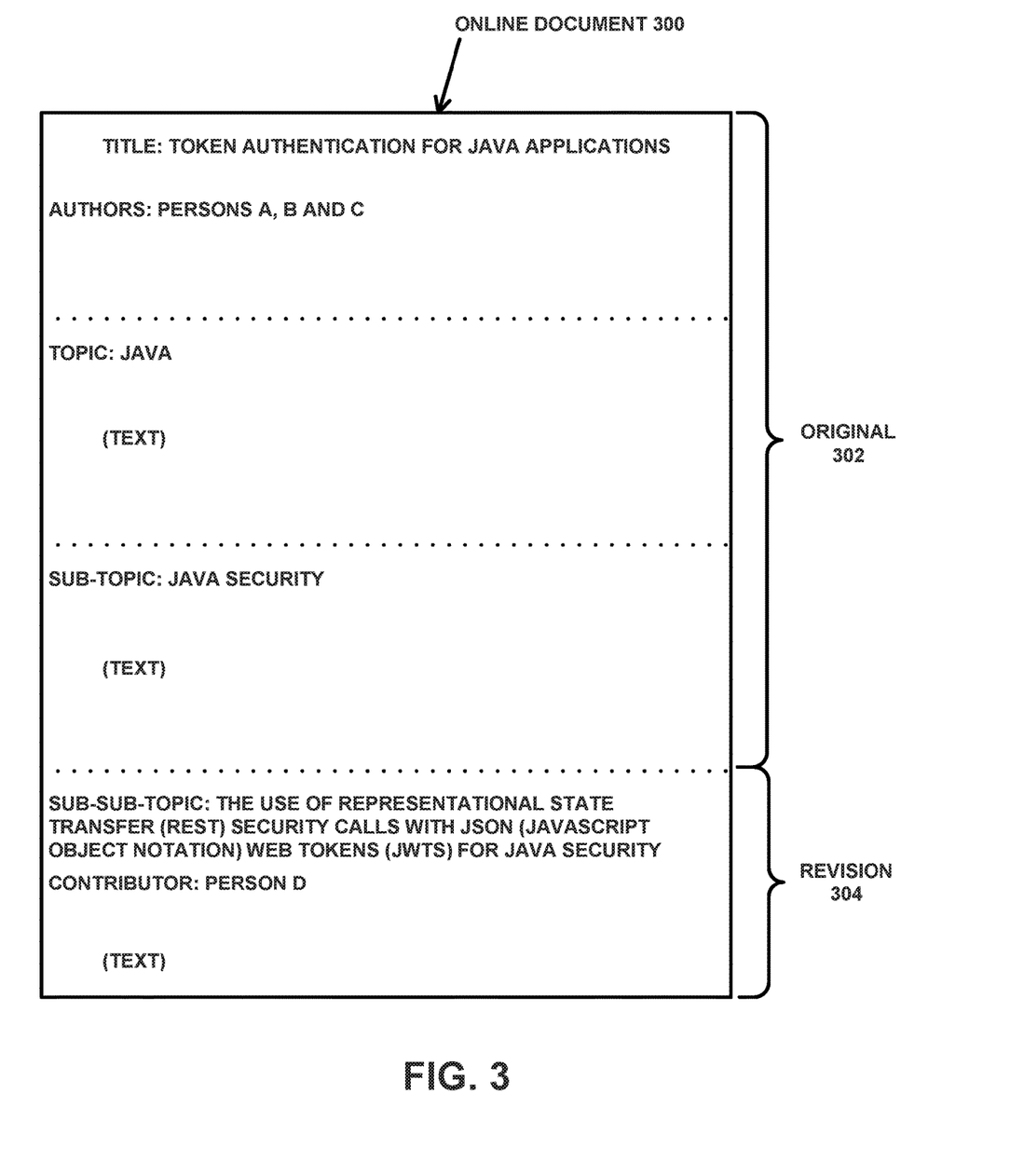
FIG. 3 is an exemplary online document that comprises reference materials, according to one embodiment.
Figure 4:
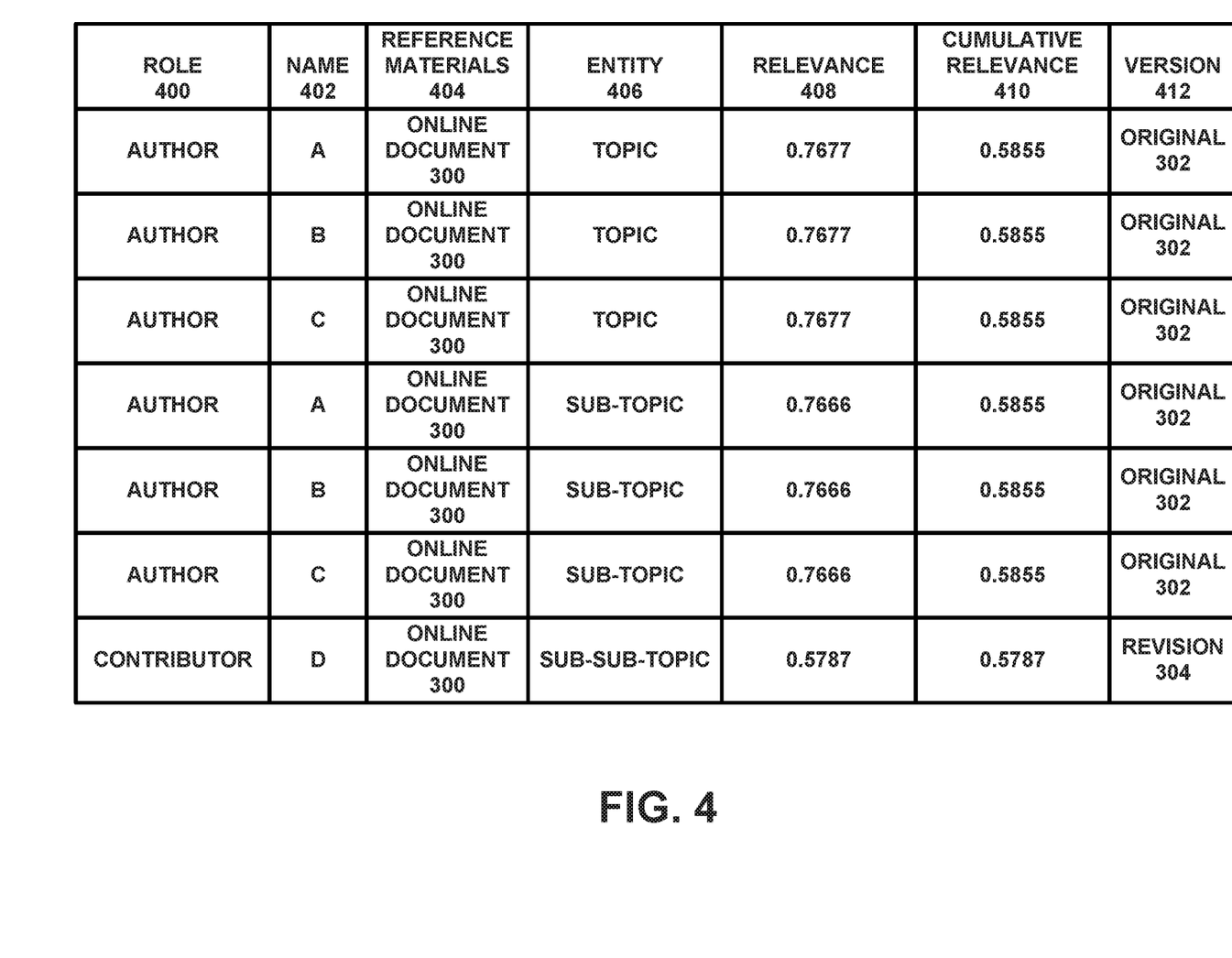
FIG. 4 is an exemplary set of entity classes for the reference materials, according to one embodiment.

Consider the following use case illustrated in FIGS. 3-4 where the system 100 is used to identify and locate an expert for a specific type of subject matter.

In this example, a user may have a question about a topic, e.g., Java, and in particular, about a sub-topic, e.g., Java security, and more specifically, a sub-sub-topic, e.g., the use of Representational State Transfer (REST) security calls with JSON (JavaScript Object Notation) Web Tokens (JWTs) for Java security.

Using one of the client devices 108, 110, 112, the user may locate and read one or more online documents 300 directed to the topic, sub-topic and/or sub-sub-topic located on one of the web sites 106, as shown in FIG. 3.

In this example, the online document 300 is titled "Token Authentication for Java Applications," and is authored by persons A, B and C. The online document 300 includes text directed to the topic of "Java," the sub-topic of "Java Security," and the sub-sub-topic of "the use of Representational State Transfer (REST) security calls with JSON (JavaScript Object Notation) Web Tokens (JWTs) for Java security." The topic and sub-topic comprise an original version 302 of the online document 300 authored by persons A, B and C, while the sub-sub-topic comprises a revision 304 to the online document 300 contributed by person D.

Identifying the online document 300 as the reference materials on the client device 108, 110, 112, the user then sends a command from the client device 108, 110, 1120 to the server 104 to identify the micro-editing experts within an appropriate network directed to the subject matter within the online document 300. In response, the server 104 performs the following steps or functions:

The Version Analysis Module 204 performs a version analysis of the online document 300 to identify different versions 302, 304 of the online document 300 from its update history. As noted above, in this example, the online document 300 itself may contain the update history, including the original version 302 of the online document 300, as well as the revision 304 to the online document 300.

The Collaboration Analysis Module 206 analyzes collaborative and/or social reference data for the different versions 302, 304 of the online document 300 to identify the authors and contributors of the subject matter contained within the different versions 302, 304 of the online document 300.

In this example, the Collaboration Analysis Module 206 determines that the original version 302 directed to the topic and sub-topic in the online document 300 were authored by persons A, B and C. In addition, the Collaboration Analysis Module 202 determines that the revision 304 directed to the sub-sub-topic in the online document 300 was contributed by person D.

The Collaboration Analysis Module 20 generates a set of entity classes for contributions made by various persons to the subject matter in the reference material 300, as shown in FIG. 4. The set of entity classes include: the role 400 (i.e., author and/or contributor) played by the various persons; the name 402 (or other identifier) of the various persons; the identity of the reference materials 404 (i.e., the name and/or locater of the online document 300); the entity 406 (i.e., topic, sub-topic, sub-sub-topic, etc.) within the subject matter; the relevance 408 of the various persons to the entity 406; the cumulative relevance 410 of the various persons; and the version 412 of the reference materials 404.

In this example, where the reference materials 404 comprise the online document 300 shown in FIG. 3, FIG. 4 illustrates that:

the names 402 of A, B and C are assigned the role 400 of "Author" for the entity 406 of "Topic" (e.g., Java), where the version 412 is the original 302 version of the online document 300;

the names 402 of A, B and C are assigned the role 400 of "Author" for the entity 406 of "Sub-Topic" (e.g., Java Security), where the version 412 is the original 302 version of the online document 300; and the name 402 of D is assigned the role 400 of "Contributor" for the entity 406 of "Sub-Sub-Topic" (e.g., the use of Representational State Transfer (REST) security calls with JSON (JavaScript Object Notation) Web Tokens (JWTs) for Java security), where the version 412 is the revision 304 to the online document 300.

The Affinity Weighting Module 208 assigns affinity weights to the relevance 408 values associated with the names 402 that authored and contributed to the entity 406 based on a history of the name 402.

In this example, where the reference materials 404 comprise the online document 300, FIG. 4 indicates that:

for the names 402 of A, B and C, the entity 406 of "Topic" has a relevance 408 value of 0.7677;

for the names 402 of A, B and C, the entity 406 of "Sub-Topic" has a relevance 408 value of 0.7666; and for the name 402 of person D, the entity 406 of "Sub-Sub-Topic" has a relevance 408 value of 0.5787.

The Affinity Aggregation Module 210 aggregates the assigned affinity weights in the relevance 408 values to generate the cumulative relevance 410 values for each of the names 402. Specifically, the assigned affinity weights in the relevance 408 values are aggregated across the different entities 406 for each of the names 402. The cumulative relevance 410 values are used to infer which of the names 402 are the micro-editing experts within an appropriate network for the entities 406.

In this example, where the reference materials 404 comprise the online document 300, FIG. 4 indicates that:

each of the names 402 of A, B and C has a cumulative relevance 410 value of 0.5855; and the name 402 of D has a cumulative relevance 410 value of 0.5787.

The Affinity Aggregation Module 210 may also aggregate the assigned affinity weights for the names 402 across different reference materials 404, different web sites 106, etc., when there are the same or similar entities 406.

The Expert Identification Module 212 then reports this information to the user who invoked the server 104 to identify the micro-editing experts within an appropriate network directed to the subject matter within the online document 300. In this example, the Expert Identification Module 212 reports that person D is deemed to be an expert in the use of REST security calls with JWTs for Java Security.

Flowchart

Figure 5:
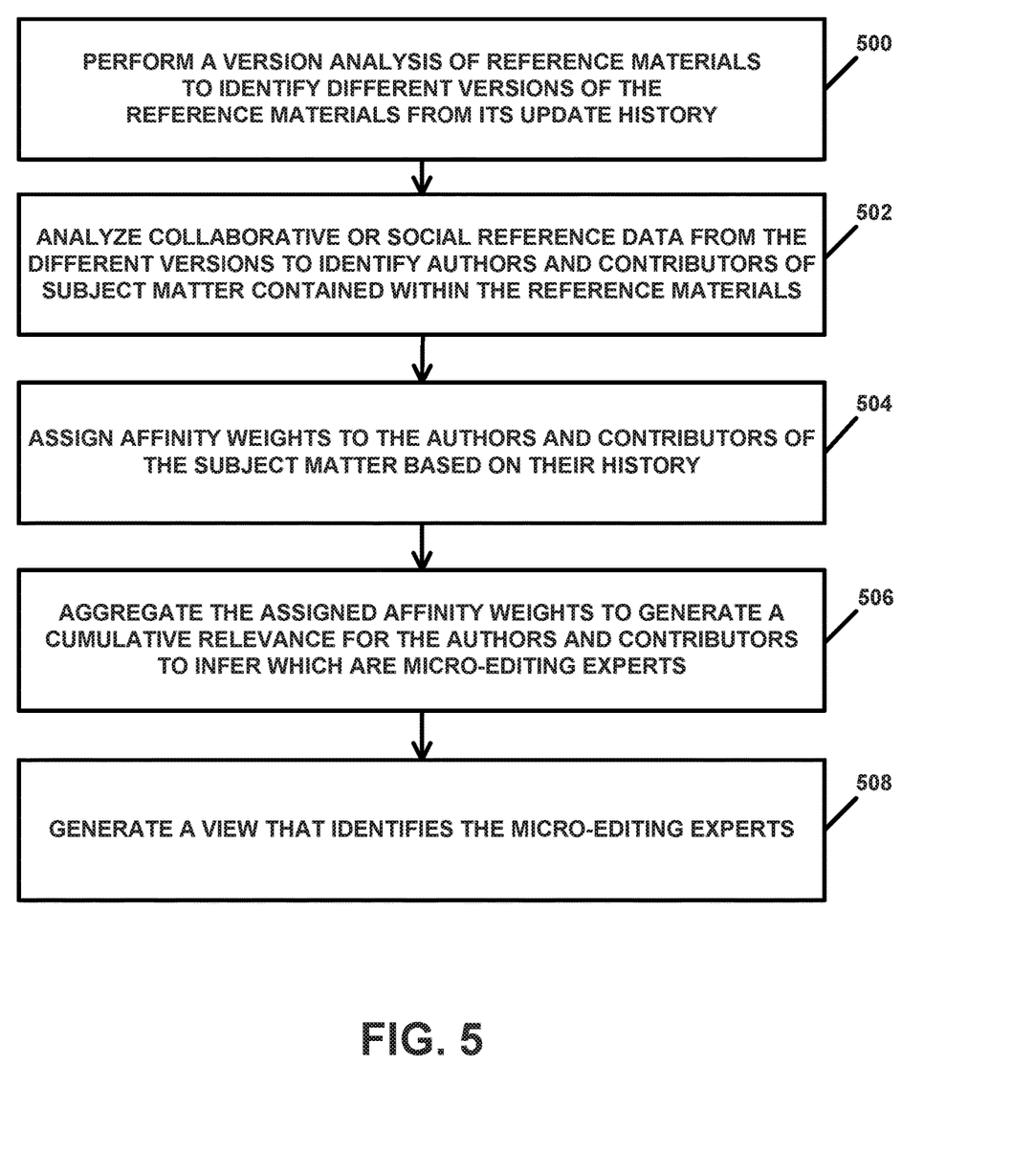
FIG. 5 is a flowchart illustrating the steps performed by the system when implementing the computer-implemented method of this invention, according to one embodiment.

FIG. 5 is a flowchart illustrating the steps performed by the system 100 when implementing the computer-implemented method of this invention, according to one embodiment. Specifically, these steps comprise the system 100 identifying one or more micro-editing experts within an appropriate network.

Block 500 represents the system 100 performing a version analysis of reference materials to identify different versions of the reference materials from an update history.

Block 502 represents the system 100 analyzing collaborative and/or social reference data from the different versions of the reference materials to identify authors and contributors of subject matter contained in the reference materials, which comprises generating a set of entity classes for contributions made by various persons to the subject matter contained within the reference material. The set of entity classes includes at least the following: roles played by the various persons; entities within the subject matter, such as topics; the relevance of the various persons to each of the entities; and the cumulative relevance of the various persons.

Block 504 represents the system 100 assigning affinity weights to the authors and contributors of the subject matter based on the authors' and contributors' history. The assigned affinity weights determine the relevance of the various persons to each of the entities.

Block 506 represents the system 100 aggregating the assigned affinity weights to generate a cumulative relevance for the authors and contributors. The assigned affinity weights may be aggregated across different entities within the subject matter. The assigned affinity weights may also be aggregated across different reference materials. The cumulative relevance is used to infer which of the authors and contributors are the micro-editing experts within the appropriate network for the subject matter contained in the reference materials.

Block 508 represents the system 100 generating a view that identifies the micro-editing experts within the appropriate network.

Alternatives and Modifications

As noted above, a version analysis may be performed on the reference materials to determine its update history, wherein the reference materials themselves contain a complete version history.

However, in other embodiments, the version analysis may be performed by: analyzing the content changes of different versions of the reference material; analyzing the timestamps associated with different versions of the reference material; analyzing metadata related to the reference materials; analyzing social media posts related to the reference materials; analyzing a timeline of comments related to the reference materials along with subsequent changes made to the reference materials; identifying one or more persons who are influencers for different versions of the reference materials; etc.

Persons who are version influencers may be determined more precisely based on natural language processing (NLP). In addition, version influencers may decrease or increase in influence as the reference material changes over time.

Statutory Subject Matter

It can be seen that the present invention provides a number of benefits and advantages. These benefits and advantages include improvements to the technology or technical field of social reference applications, and more specifically, locating expertise in an online environment. These benefits and advantages also include improvements to the functioning of the computers themselves, as compared to prior computer-implemented methods and systems for identifying expertise in various subject matter areas.

With regard to improvements to the technology or technical field, the computer-implemented method and system provides more accurate identifications of expertise in various subject matter areas. Specifically, experts can be identified by their micro-editing efforts of feedback, comments or revisions, and the like, to reference materials authored by others. By analyzing different versions of the reference materials from an update history, contributors of subject matter contained in the reference materials can be identified, separately from the authors of the reference materials. Moreover, affinity weights are assigned to the contributors as well as authors of the subject matter contained in the reference materials based on the authors' and contributors' history, which are aggregated to generate a cumulative relevance for the authors and contributors that is used to infer which of the authors and contributors are the micro-editing experts within the appropriate network for the subject matter contained in the reference materials.

With regard to improvements to the functioning of the computer itself, the computer-implemented method and system of this invention is optimized through its use of: a Version Analysis Module 204 that performs a version analysis of the reference materials to identify different versions of the reference materials from its update history; a Collaboration Analysis Module 206 that analyzes collaborative and/or social reference data from the different versions of the reference materials to identify authors of and contributors to the subject matter contained within the reference materials; an Affinity Weighting Module 208 that assigns affinity weights to the authors and contributors of the subject matter based on the authors' and contributors' history; an Affinity Aggregation Module 210 aggregates the assigned affinity weights to generate a cumulative relevance for the authors and contributors, wherein the cumulative relevance is used to infer which of the authors and contributors are the micro-editing experts within the appropriate network for the subject matter contained in the reference materials; and an Expert Identification Module 212 reports this information to the user who invoked the system 100 for identifying micro-editing experts within an appropriate network.

Both generally and specifically, these steps and functions of the computer-implemented method and system comprise specific improvements other than what is well-understood, routine and conventional in the field. Moreover, these steps and functions of the computer-implemented method and system add unconventional steps to a particular useful application.

These improvements provide improved results and performance related to the identification of expertise in various subject matter areas. Users and administrators are able to more accurately judge the results and performance related to the identification of expertise in various subject matter areas.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:
1. A computer-implemented method, comprising:
  accessing reference materials from an online resource;
  receiving a request from a user to identify one or more micro-editing experts associated with the accessed reference materials;
  responsive to the request, performing a version analysis of the reference materials to identify different versions of the reference materials from an update history of the reference materials, wherein the reference materials comprise at least one online document created and modified in real-time using a collaborative editor;
  analyzing collaborative or social reference data for the different versions of the reference materials to identify authors and contributors of a subject matter contained in the reference materials;
  assigning affinity weights to each of the authors and contributors of the subject matter contained in the reference materials based on the authors' and contributors' contributing history associated with the collaborative or social reference data;
  aggregating the assigned affinity weights to generate a cumulative relevance for each of the authors and contributors, wherein the cumulative relevance is used to infer which of the authors and contributors are the one or more micro-editing experts for the subject matter contained in the reference materials; and
  generating a view that identifies the one or more micro-editing experts to the user.

2. The method of claim 1, wherein the reference materials are contained on the online resource.

3. The method of claim 1, wherein the authors and contributors make contributions to the reference materials by micro-editing, the micro-editing comprising feedback, comments, revisions, or any combination thereof.

4. The method of claim 3, wherein the feedback, comments or revisions are contained within the reference materials.

5. The method of claim 1, wherein the different versions of the reference materials are contained within the reference materials.

6. The method of claim 1, wherein the collaborative or social reference data are contained within the reference materials.

7. The method of claim 1, wherein the analyzing collaborative or social reference data further comprises:
  generating a set of entity classes for contributions made by various persons to the subject matter contained within the reference materials.

8. The method of claim 7, wherein the set of entity classes includes:
  roles played by the various persons;
  entities within the subject matter;
  a relevance of the various persons to each of the entities; and
  a cumulative relevance of the various persons.

9. The method of claim 8, wherein the entities comprise topics within the subject matter.

10. The method of claim 8, wherein an affinity weight is assigned that determines the relevance of the various persons to each of the entities.

11. The method of claim 10, wherein the affinity weights are aggregated across different entities within the subject matter.

12. The method of claim 10, wherein the affinity weights are aggregated across different reference materials.

13. A computer-implemented system, comprising:
  one or more computers programmed for:
    accessing reference materials from an online resource;

receiving a request from a user to identify one or more micro-editing experts associated with the accessed reference materials;

responsive to the request, performing a version analysis of the reference materials to identify different versions of the reference materials from an update history of the reference materials, wherein the reference materials comprise at least one online document created and modified in real-time using a collaborative editor;

analyzing collaborative or social reference data for the different versions of the reference materials to identify authors and contributors of a subject matter contained in the reference materials;

assigning affinity weights to each of the authors and contributors of the subject matter contained in the reference materials based on the authors' and contributors' contributing history associated with the collaborative or social reference data;

aggregating the assigned affinity weights to generate a cumulative relevance for each of the authors and contributors, wherein the cumulative relevance is used to infer which of the authors and contributors are the one or more micro-editing experts for the subject matter contained in the reference materials; and generating a view that identifies the one or more micro-editing experts to the user.

14. The system of claim 13, wherein the reference materials are contained on the online resource.

15. The system of claim 13, wherein the authors and contributors make contributions to the reference materials by micro-editing, the micro-editing comprising feedback, comments, revisions, or any combination thereof.

16. The system of claim 15, wherein the feedback, comments or revisions are contained within the reference materials.

17. The system of claim 13, wherein the different versions of the reference materials are contained within the reference materials.

18. The system of claim 13, wherein the collaborative or social reference data are contained within the reference materials.

19. The system of claim 13, wherein the analyzing collaborative or social reference data further comprises:

generating a set of entity classes for contributions made by various persons to the subject matter contained within the reference materials.

20. The system of claim 19, wherein the set of entity classes includes:

roles played by the various persons;
entities within the subject matter;
a relevance of the various persons to each of the entities; and
a cumulative relevance of the various persons.

21. The system of claim 20, wherein the entities comprise topics within the subject matter.

22. The system of claim 20, wherein an affinity weight is assigned that determines the relevance of the various persons to each of the entities.

23. The system of claim 22, wherein the affinity weights are aggregated across different entities within the subject matter.

24. The system of claim 22, wherein the affinity weights are aggregated across different reference materials.

25. A computer program product, the computer program product comprising a computer readable storage medium having program instructions embodied therewith, the program instructions executable by one or more computers to cause the computers to perform a method, comprising:

accessing reference materials from an online resource;

receiving a request from a user to identify one or more micro-editing experts associated with the accessed reference materials;

responsive to the request, performing a version analysis of the reference materials to identify different versions of the reference materials from an update history of the reference materials, wherein the reference materials comprise at least one online document created and modified in real-time using a collaborative editor;

analyzing collaborative or social reference data for the different versions of the reference materials to identify authors and contributors of a subject matter contained in the reference materials;

assigning affinity weights to each of the authors and contributors of the subject matter contained in the reference materials based on the authors' and contributors' contributing history associated with the collaborative or social reference data;

aggregating the assigned affinity weights to generate a cumulative relevance for each of the authors and contributors, wherein the cumulative relevance is used to infer which of the authors and contributors are the one or more micro-editing experts for the subject matter contained in the reference materials; and generating a view that identifies the one or more micro-editing experts to the user.

26. The computer program product of claim 25, wherein the reference materials are contained on the online resource.

27. The computer program product of claim 25, wherein the authors and contributors make contributions to the reference materials by micro-editing, the micro-editing comprising feedback, comments, revisions, or any combination thereof.

28. The computer program product of claim 27, wherein the feedback, comments or revisions are contained within the reference materials.

29. The computer program product of claim 25, wherein the different versions of the reference materials are contained within the reference materials.

30. The computer program product of claim 25, wherein the collaborative or social reference data are contained within the reference materials.

31. The computer program product of claim 25, wherein the analyzing collaborative or social reference data further comprises:

generating a set of entity classes for contributions made by various persons to the subject matter contained within the reference materials.

32. The computer program product of claim 31, wherein the set of entity classes includes:

roles played by the various persons;
entities within the subject matter;
a relevance of the various persons to each of the entities; and
a cumulative relevance of the various persons.

33. The computer program product of claim 32, wherein the entities comprise topics within the subject matter.

34. The computer program product of claim 32, wherein an affinity weight is assigned that determines the relevance of the various persons to each of the entities.

35. The computer program product of claim 34, wherein the affinity weights are aggregated across different entities within the subject matter.

36. The computer program product of claim 34, wherein the affinity weights are aggregated across different reference materials.

\* \* \* \* \*